United States Patent
King et al.

(10) Patent No.: US 8,705,146 B2
(45) Date of Patent: Apr. 22, 2014

(54) SYSTEM FOR ILLUMINATING AN ORIGINAL USING ADDITIONAL COLORS AND CAPTURING AN IMAGE THEREOF

(75) Inventors: Anthony Michael King, Lexington, KY (US); Mark Eric Miller, Versailles, KY (US); Ronald Todd Sellers, Stamping Ground, KY (US)

(73) Assignee: Lexmark International, Inc., Lexington, KY (US)

( * ) Notice: Subject to any disclaimer, the term of this patent is extended or adjusted under 35 U.S.C. 154(b) by 856 days.

(21) Appl. No.: 12/625,037

(22) Filed: Nov. 24, 2009

(65) Prior Publication Data
US 2011/0122465 A1 May 26, 2011

(51) Int. Cl.
*H04N 1/04* (2006.01)
*H04N 1/46* (2006.01)

(52) U.S. Cl.
USPC ............ 358/474; 358/475; 358/509; 358/505

(58) Field of Classification Search
USPC ......... 358/473, 474, 483, 482, 505, 512–514, 358/509, 49; 382/312, 313; 250/208.1, 250/234–236, 239, 216; 362/800
See application file for complete search history.

(56) References Cited

U.S. PATENT DOCUMENTS

| | | | |
|---|---|---|---|
| 7,537,170 B2 | 5/2009 | Reed et al. | |
| 7,684,095 B2 | 3/2010 | Nystrom et al. | |
| 7,687,753 B2 | 3/2010 | Ashdown | |
| 7,746,517 B2 * | 6/2010 | Miller et al. ................ | 358/474 |
| 7,762,468 B2 | 7/2010 | Jones et al. | |
| 7,843,611 B2 * | 11/2010 | Albahri ....................... | 358/474 |
| 8,123,134 B2 | 2/2012 | Jones et al. | |
| 8,134,759 B2 * | 3/2012 | Albahri ....................... | 358/474 |
| 8,154,775 B2 * | 4/2012 | Jeong et al. ................. | 358/474 |
| 8,203,713 B2 | 6/2012 | Ramirez Mancilla et al. | |
| 8,559,074 B2 * | 10/2013 | Keniston et al. ............. | 358/475 |
| 2003/0081824 A1 | 5/2003 | Mennie et al. | |
| 2006/0072171 A1 | 4/2006 | Nystrom et al. | |
| 2008/0144013 A1 | 6/2008 | Lanoue et al. | |
| 2010/0079983 A1 * | 4/2010 | Kumamoto .................. | 362/147 |
| 2010/0118327 A1 * | 5/2010 | Caspar et al. ............... | 358/1.13 |
| 2011/0122460 A1 * | 5/2011 | King et al. .................. | 358/474 |
| 2012/0243054 A1 * | 9/2012 | Sellers ......................... | 358/448 |
| 2012/0263395 A1 * | 10/2012 | Sellers et al. ................ | 382/275 |
| 2013/0135695 A1 | 5/2013 | Han | |

* cited by examiner

*Primary Examiner* — Cheukfan Lee
(74) *Attorney, Agent, or Firm* — John Victor Pezdek

(57) ABSTRACT

An imaging device including a base and an enclosed chamber positioned on the base. The enclosed chamber has a scanning surface inclined with respect to the base, a reflecting member positioned opposite to the scanning surface and an imaging member adjacent the scanning surface and oriented towards the reflecting member. The imaging member is illuminated with a red, a green, a blue, and an additional color LED. In one embodiment the additional color is a color other than red, green, and blue. In an alternate embodiment the additional color is Ultraviolet (UV) or Infra-Red (IR).

15 Claims, 8 Drawing Sheets

SYSTEM FOR ILLUMINATING AN ORIGINAL USING ADDITIONAL COLORS AND CAPTURING AN IMAGE THEREOF

BACKGROUND

1. Field of the Invention

The present invention relates generally to scanners and scanning methods that have an inclined imaging surface positioned on a base and that include additional light sources of color other than red, green, and blue for illuminating an original.

2. Description of the Related Art

Flatbed desktop scanners, either of the all in one type or independent variety, are popular in both businesses and personal use. The flatbed desktop scanner contains a rectangular base portion and a ledge positioned on the base portion. An original to be scanned is positioned on a scanning surface of the rectangular base portion, the ledge is closed and the original is scanned by the scanner. A disadvantage of such flatbed desktop scanners is that it requires a lot of desktop space that is undesirable.

Further, conventional scanners uses a scan bar for illuminating an original where the scan bar includes a red, a green, and a blue (RGB) LED to illuminate an original and an imaging element for capturing an image of the original. A major drawback of these scan bars is that there are visible areas in between the color spectrums of red, green, and blue that are not well illuminated.

FIG. 1 is a graphical illustration of areas 10 of the color spectrum that are well illuminated by the red, green, blue LEDs and areas 12 that are not well illuminated in an RGB system. Accordingly, some colors of the original are difficult for the imaging element to see since there is little light in those areas and the color reproduction in region 12 is difficult.

In conventional system, the actual colors in the areas 12 are assumed resulting in undesirable color tints for these colors in the scan of the original. This is referred to as metameric mismatch.

Therefore, it would be desirable to have a scanner that requires less desk space and captures an image devoid of undesirable color tints, thereby addressing the problem of metameric mismatch and providing an improved output image.

SUMMARY OF THE INVENTION

Disclosed herein is an imaging device for illuminating and imaging an original that includes a base and an enclosed chamber, the enclosed chamber including an imaging surface for holding the original, the imaging surface inclined at predetermined angle relative to the base, a plurality of light sources arranged around a perimeter of the imaging surface for illuminating the imaging surface, a reflective member positioned opposite to the imaging surface for reflecting light projected from the imaging surface, and an imaging member disposed adjacent the imaging surface and oriented towards the reflective member, to receive the reflected light from the reflective member.

In some embodiments, the plurality of light sources include at least one red color LED, at least one blue color LED, at least one green color LED, and at least one LED having a color other than red, blue, and green.

In another embodiment, the plurality of light sources include at least one red color LED, at least one blue color LED, at least one green color LED, and at least one of a ultraviolet LED and an infrared LED.

In another embodiment, the enclosed chamber further includes a ledge disposed along at least a portion of one edge of the imaging surface to support an original placed on the imaging surface.

In another aspect, a method for illuminating and imaging an original in an imaging device including placing the original on an imaging surface in the imaging device, illuminating the original with a first light source that includes a first color, capturing a first image of the original illuminated by the first color, illuminating the original with a second light source that includes a second color, the second color being different from the first color, capturing a second image of the original illuminated by the second color, illuminating the original with a third light source that includes a third color, the third color being different from the first and second colors, capturing a third image of the original illuminated by the third color, illuminating the original with at least one additional light source that includes an additional color, capturing at least one additional image of the original illuminated by the additional color, the additional color being different from the first, second, and third colors, and processing the first image, the second image, the third image, and the at least one additional image to obtain a composite color image of the original.

In yet another aspect, a method for illuminating and imaging an original in an imaging device including placing the original on an imaging surface in the imaging device, illuminating the original with a first light source that includes a first color, capturing a first image of the original illuminated by the first color, illuminating the original with a second light source that includes a second color, the second color being different from the first color, capturing a second image of the original illuminated by the second color, illuminating the original with a third light source that includes a third color, the third color being different from the first and second colors, capturing a third image of the original illuminated by the third color, illuminating the original with at least one additional light source that includes an additional color, capturing at least one additional image of the original illuminated by the additional color, the additional color being different from the first, second, and third colors, processing the first image, the second image, the third image, to obtain a composite color image of the original, and processing the at least one additional image of the original to obtain information relating to the position.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

BRIEF DESCRIPTION OF THE DRAWINGS

The above-mentioned and other features and advantages of the various embodiments of the invention, and the manner of attaining them, will become more apparent will be better understood by reference to the accompanying drawings, wherein.

DETAILED DESCRIPTION

Figure 1:
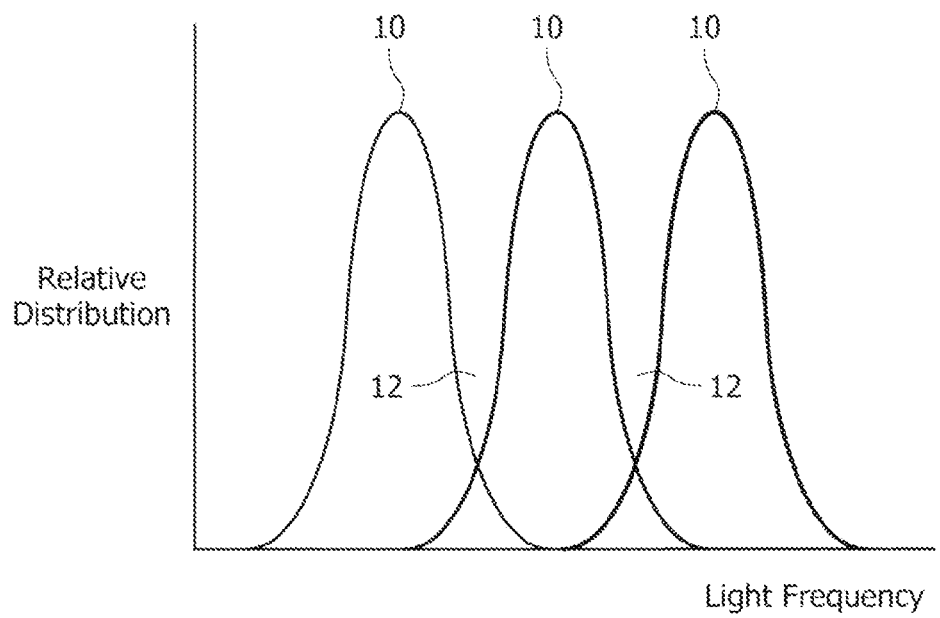
FIG. 1 is a graphical representation of the prior art showing areas of color spectrum with variable illumination in an RGB system according to one embodiment of the present invention.

Reference will now be made in detail to the exemplary embodiment(s) of the invention, as illustrated in the accompanying drawings. Whenever possible, the same reference numerals will be used throughout the drawings to refer to the same or like parts.

Figure 2:
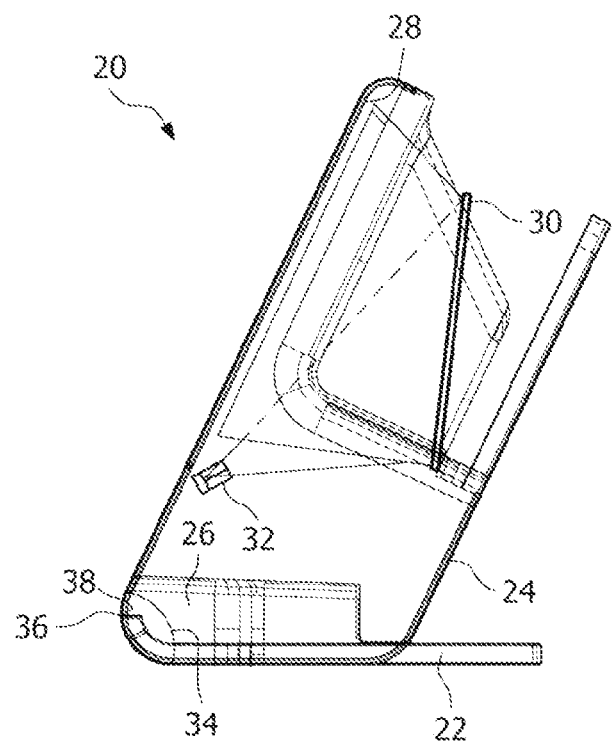
FIG. 2 is a right side elevational view of a scanning device that includes a base and an enclosed chamber positioned on the base according to one embodiment of the present invention.

FIG. 2 illustrates one embodiment of an imaging device according to the present invention, of which the imaging device is a scanning device 20. The scanning device 20 comprises a base 22 and an enclosed chamber 24 positioned on the base 22. The scanning device 20 also includes a print engine 26 resting on the base 22. The enclosed chamber 24 includes an imaging surface 28, a reflective member 30, and an imaging member 32. The enclosed chamber 24 is positioned such that the imaging surface 28 is inclined at an angle 34 with respect to the base 22. In one embodiment, the angle 34 at which the imaging surface 28 is inclined with respect to the base 22 is about 80 degrees. The enclosed chamber 24 includes a ledge 36 disposed along an edge 38 of the imaging surface 28 for covering the imaging surface 28 and retaining an original 40 (FIG. 4) positioned on the imaging surface 28.

Figure 3:
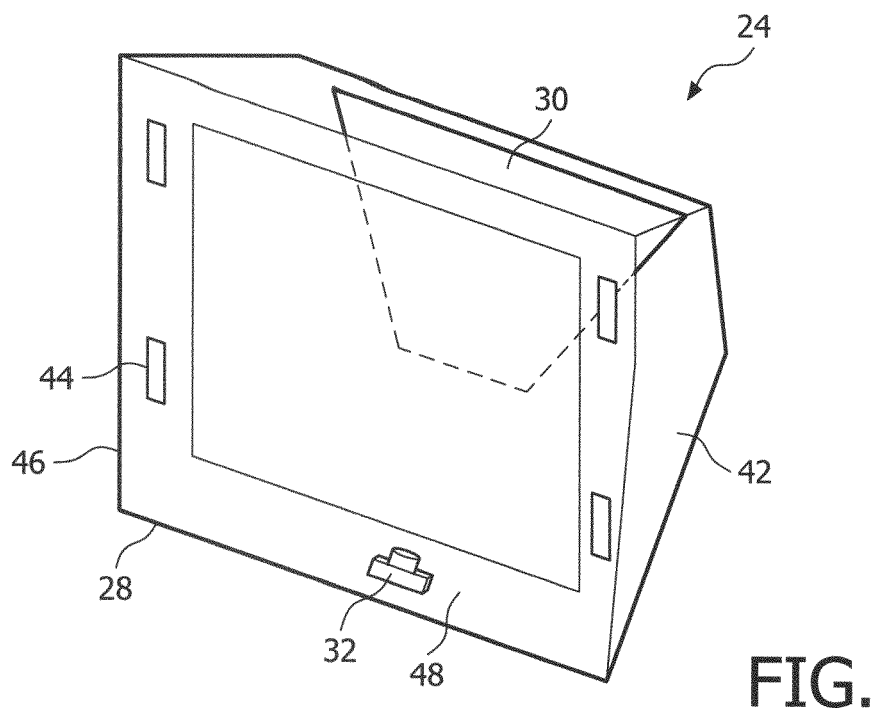
FIG. 3 is a top perspective of the enclosed chamber without a ledge according to one embodiment of the present invention.

FIG. 3 illustrates a top perspective of the enclosed chamber 24 without the ledge 36. The enclosed chamber 24 defines an interior volume 42 that is used for capturing an image of the original 40 (FIG. 4) positioned on the imaging surface 28. The enclosed chamber 24 includes a plurality of light sources 44 arranged around a perimeter 46 of the imaging surface 28. The plurality of light sources 44 illuminate the original 40 (FIG. 4) positioned on the imaging surface 28. In one embodiment the light sources 44 are light emitting diodes (LEDs).

The imaging member 32 is disposed on a wall 48 adjacent the imaging surface 28. The imaging member 32 captures an image of the original 40 positioned on the imaging surface 28. The imaging member 32 may be a camera. In one embodiment the imaging member 32 is a monochromatic imaging member. The reflective member 30 is positioned opposite to the imaging surface 28. The reflective member 30 reflects the image of the original 40 to the imaging member 32. In one embodiment the reflective member 30 is a mirror, but may also be a lens.

Figure 4:
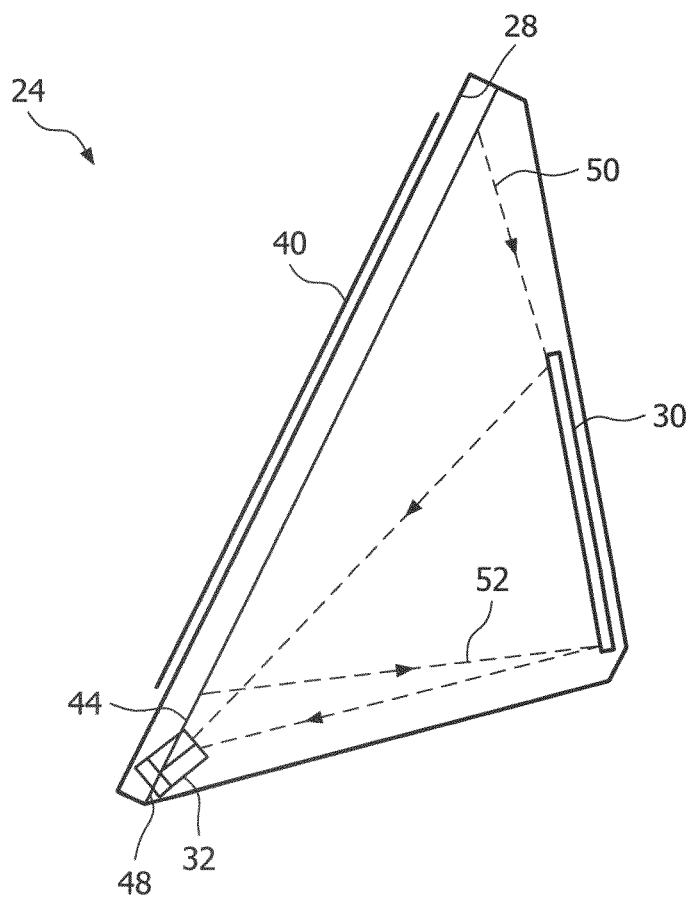
FIG. 4 is a schematic view of the process of capturing an image of an original positioned on the imaging surface in the enclosed chamber according to one embodiment of the present invention.

FIG. 4 illustrates in detail an image capturing process within the interior volume 42 of the enclosed chamber 24. As shown, light rays 50, 52 reflected off the original 40 positioned on the imaging surface 28 and representing the image of the illuminated original 40 are received by the reflective member 30. The reflective member 30 reflects the light rays 50, 52 to the imaging member 32 that then captures the image of the original 40 positioned on the imaging surface 28.

Figure 5:
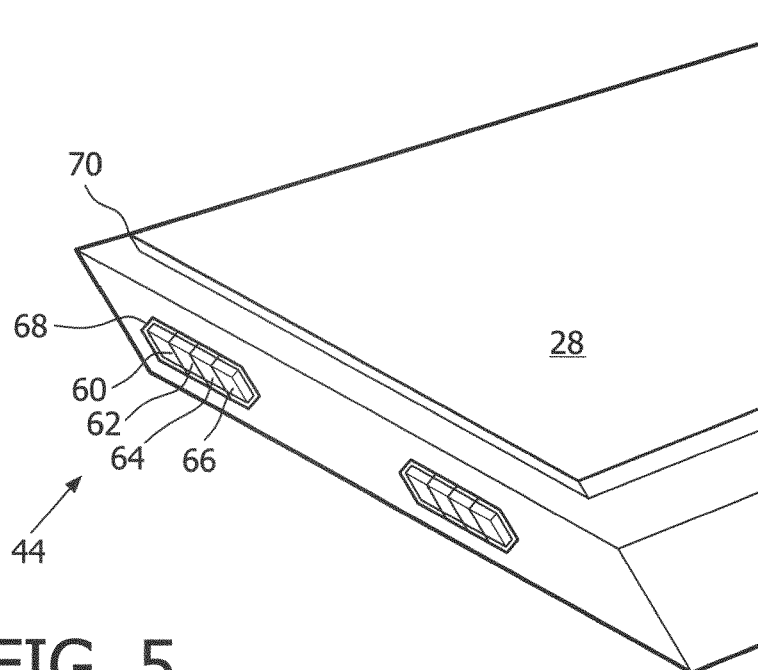
FIG. 5 is a partial schematic view of light sources having light guides positioned in front of the light sources for securing the light sources to the imaging surface according to one embodiment of the present invention.

FIG. 5 illustrates one embodiment of the light sources 44 arranged around the imaging surface 28. The light sources include a red LED 60, a blue LED 62, a green LED 64, and a LED 66 having an additional color. Each of the LEDs 60, 62, 64, and 66 can be controlled independently. In one embodiment, the additional color is a color other than red, green, or blue. Alternatively, the additional color may be ultra-violet (UV) or Infra-Red (IR). Each of the LEDs 60, 62, 64, and 66 has a light guide 68 positioned in front of the LEDs 60, 62, 64, and 66. The light guide 68 secures the plurality of LEDs 60, 62, 64, and 66 to the imaging surface 28 and focuses the light emitted from the LEDs 60, 62, 64, and 66 to the imaging surface 28. In one embodiment, the LEDs 60, 62, 64, and 66 are arranged around the corner portion 70 of the imaging surface 28.

Figure 6:
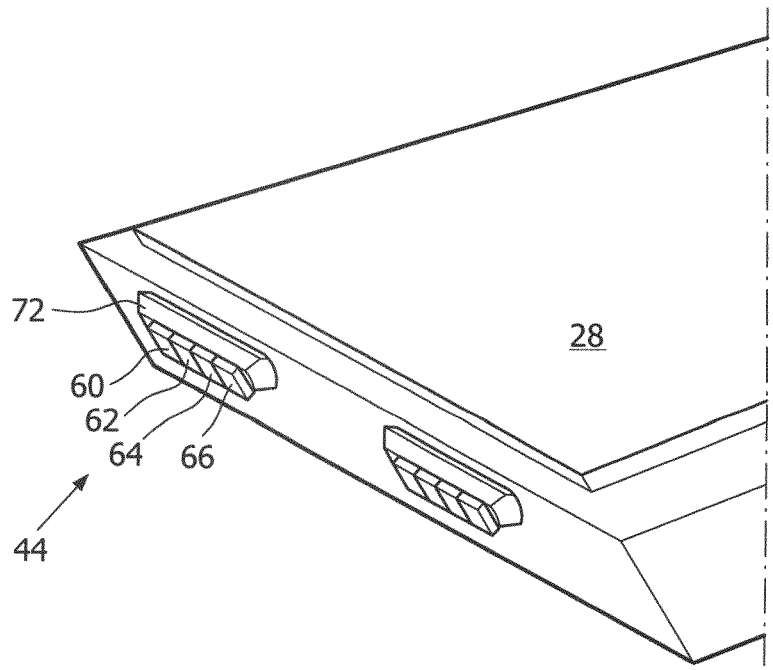
FIG. 6 is a partial schematic view of light sources having a diverging lens positioned in front of the light sources according to one embodiment of the present invention.

FIG. 6 illustrates another embodiment of the arrangement of light sources 44 around the imaging surface 28. The light sources 44 include a red LED 60, a blue LED 62, a green LED 64, and a LED 66 having an additional color. Each of the LEDs 60, 62, 64, and 66 can be controlled independently. In one embodiment, the additional color is a color other than red, green, or blue. Alternatively, the additional color may be ultra-violet (UV) or Infra-ed (IR). A diverging lens 72 is positioned in front of the LEDs 60, 62, 64, and 66. The diverging lens 72 diverges the light of the LEDs 60, 62, 64, and 66 to the corner 70 of the imaging surface 28.

FIGS. 7A-7D illustrate the original 40 positioned on the imaging surface 28 being sequentially illuminated with light sources 44A, 44B, 44C, and 44D each of the light sources 44A, 44B, 44C, and 44D having different color.

Figure 7B:
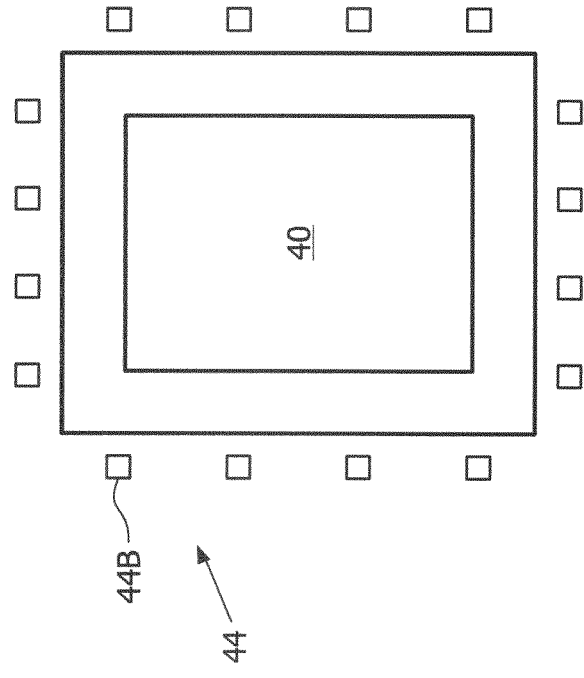
FIGS. 7A-7D are schematic view depicting plurality of light sources sequentially illuminating an original positioned on the imaging surface, each plurality of light sources being of different color according to one embodiment of the present invention.
Figure 7A:
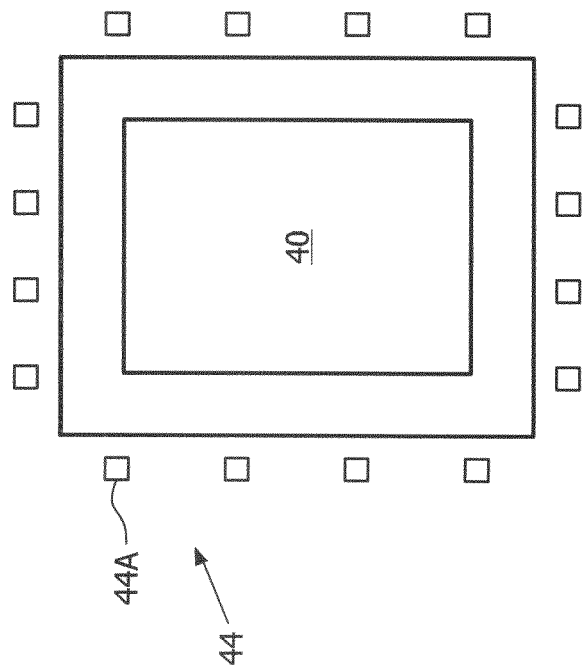
Figure 7D:
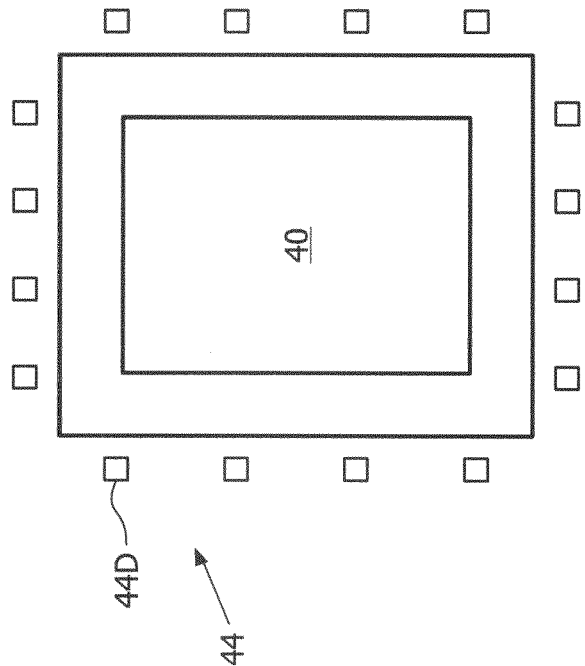
Figure 7C:
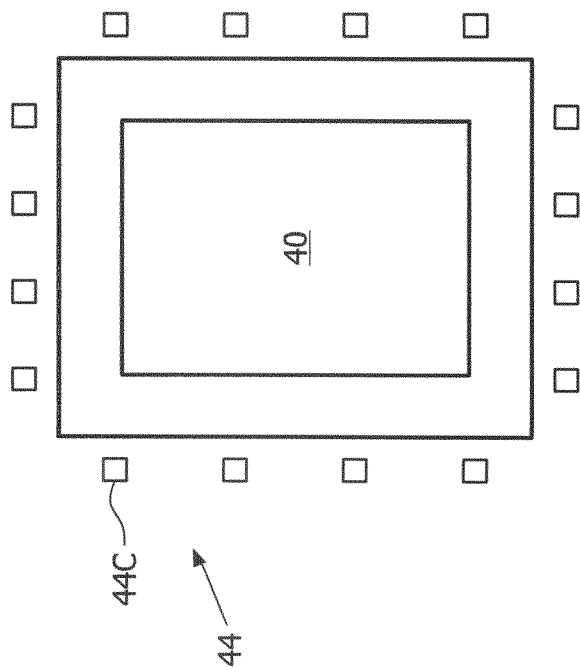
Figure 8:
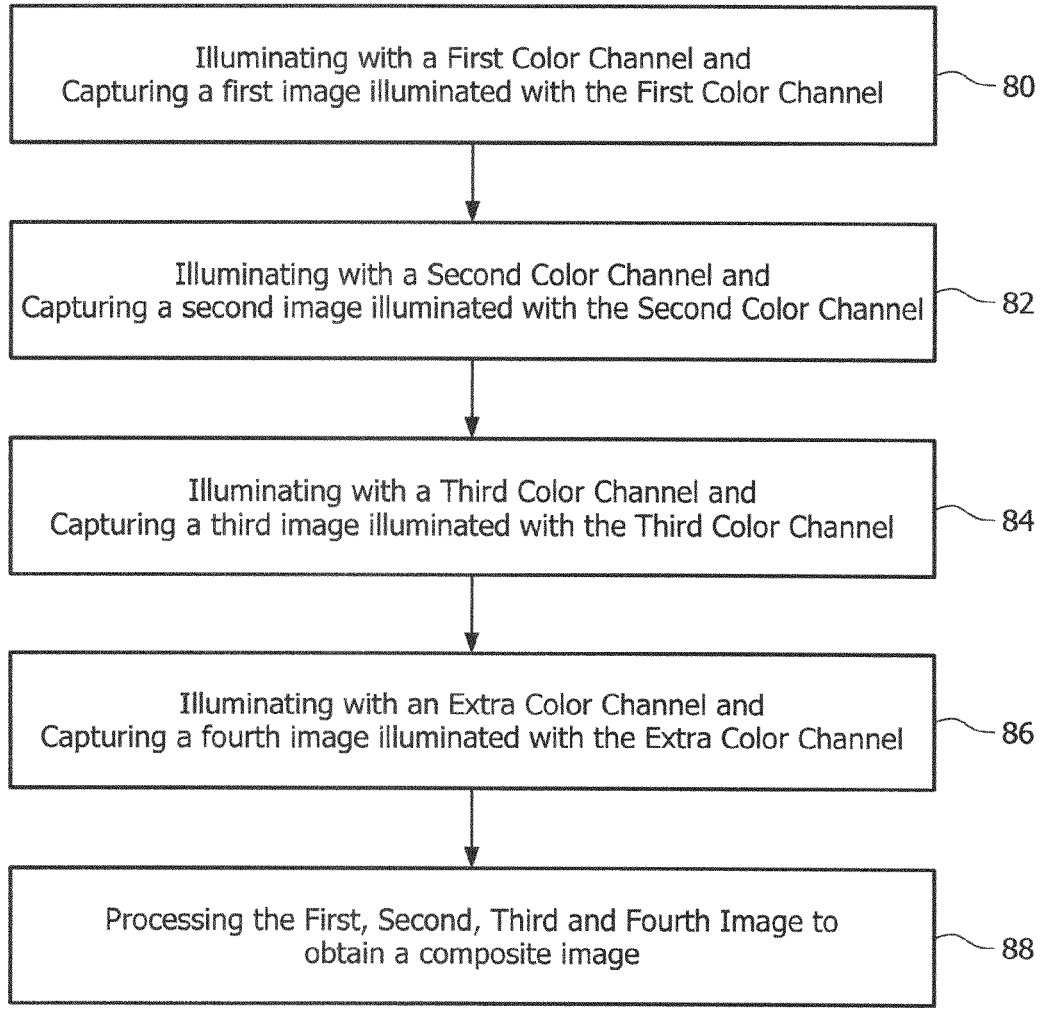
FIG. 8 is a flow diagram of the steps used in capturing separate color images of the original illuminated by the light sources of FIGS. 7A-7D and then merging them to obtain a composite color image of the original, when one of the light sources is of a color other than red, green, and blue.

FIG. 8 illustrates the processing steps used in capturing separate color images of the original 40 illuminated by the light sources 44A, 44B, 44C, and 44D of FIGS. 7A-7D and then merging them to obtain a composite color image of the original 40, when one of the light source from among the light sources 44A, 44B, 44C, and 44D is of a color other than red, green, and blue. Specifically, in FIG. 7A and at step 80 in FIG. 8 the first light source 44A illuminates the original 40 to obtain a first color image of the original 40 that is then captured by the imaging member 32. In FIG. 7B and at step 82 in FIG. 8 the second light source 44B illuminates the original 40 to obtain a second color image of the original 40 that is then captured by the imaging member 32. In FIG. 7C and at step 84 in FIG. 8, the third light source 44C illuminates the original 40 to obtain a third color image of the original 40 that is then captured by the imaging member 32. In FIG. 7D and at step 86 in FIG. 8, the fourth light source 44D illuminates the original 40 to obtain a fourth color image of the original 40 that is then captured by the imaging member 32. The first, second, and third light sources 44A, 44B, and 44C may comprise a red, green, and blue LED. The fourth light source 44D may comprise a color other than red, green, and blue. Illuminating the original 40 with four light sources 44 each of different color is an exemplary arrangement of the present invention and illuminating the original with any number of light sources each of different color would fall within the scope of the present invention.

At step 88, color processing is implemented to obtain a composite color image of the original 40 by combining each of the first, second, third, and fourth color images. Since each color image is individually captured, the exposure, gain, gamma correction, illumination, filtering, calibration, and color table for each color can be independently controlled for better fidelity.

Figure 9:
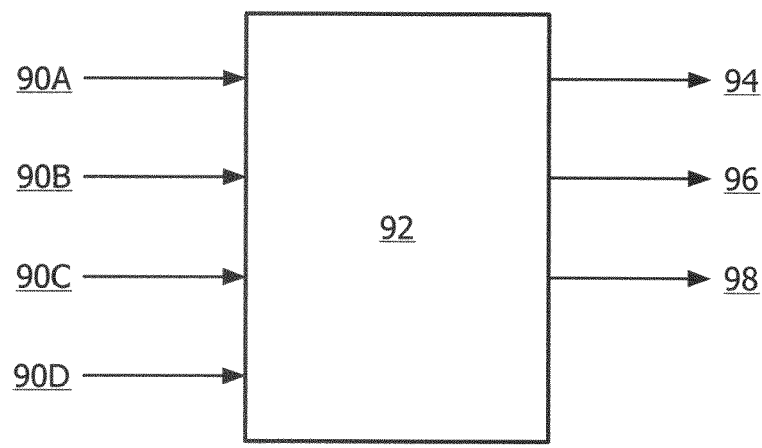
FIG. 9 illustrates a block diagram of the color processing as performed by step 88 of FIG. 8.

FIG. 9 illustrates a block diagram of the color processing as performed by step 88 of FIG. 8. As shown the image data 90A, 90B, 90C, and 90D obtained by illuminating the original 40 with each of the light sources 44A, 44B, 44C, and 44D respectively are used as input value into a color table 92. The color table 92 includes corresponding color information needed to obtain a standard red 94, a standard green 96, and a standard blue 98 value of the composite color image.

Figure 10:
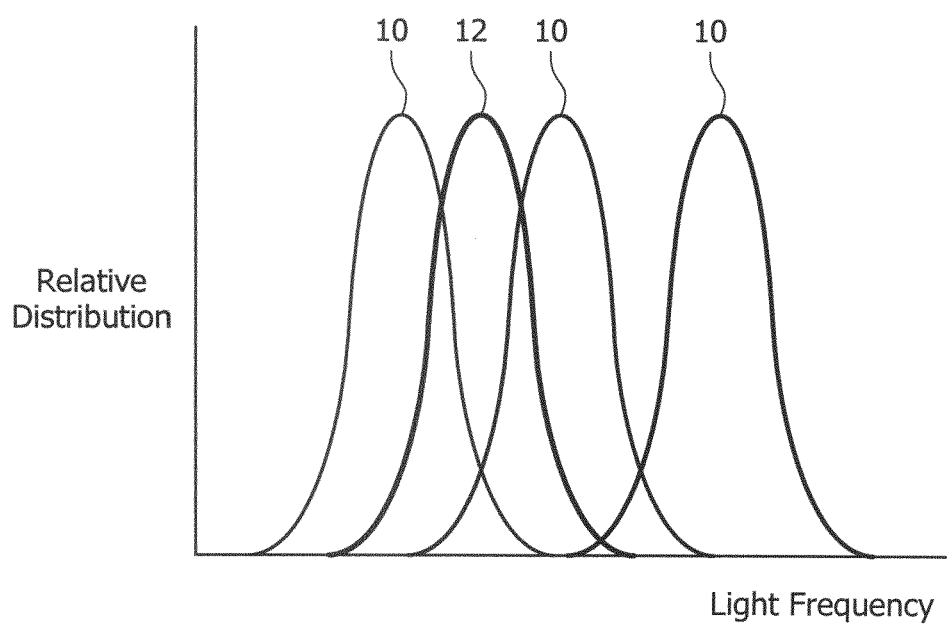
FIG. 10 is a graphical representation showing areas of color spectrum with same illumination in a system illuminated with additional color.

FIG. 10 illustrates graphically that illuminating the original using a fourth color other than red, blue, and green ensures that areas 10 as well as areas 12 of the color spectrum are illuminated properly. Thus, as all visible areas 10, 12 in the color spectrum are well illuminated, the problem of metameric mismatch is addressed.

Figure 11:
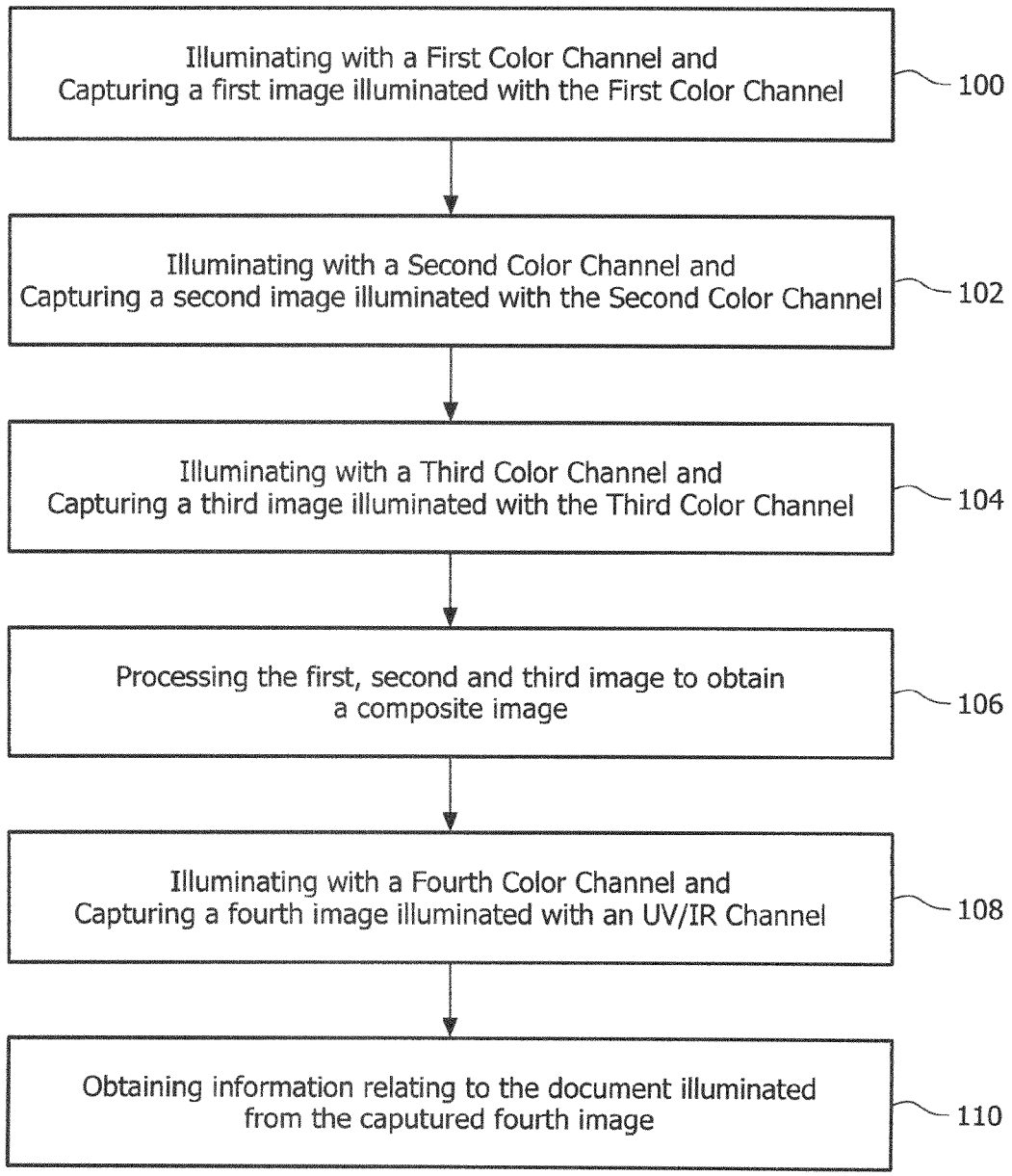
FIG. 11 is a flow diagram of the steps used in capturing separate color images of the original illuminated by the light sources of FIGS. 7A-7D, merging the color images obtained by illuminating the original with light sources of FIGS. 7A-7C and obtaining information related to the original by illuminating the original with light source of FIG. 7D, where one of the light sources is ultra-violet or infra-red.

FIG. 11 is a flow diagram of the steps used in capturing separate color images of the original 40 illuminated by the light sources 44A, 44B, 44C, and 44D of FIGS. 7A-7D, merging any three of the color images to obtain a composite color image of the original 40 and obtaining information related to the original 40 from the fourth color image, where one of the light sources 44A, 44B, 44C, 44D is ultra-violet (UV) or Infra-Red (IR). Specifically, in FIG. 7A and at step 100 in FIG. 11 the first light source 44A illuminates the original 40 to obtain a first color image of the original 40 that is then captured by the imaging member 32. In FIG. 7B and at step 102 in FIG. 11, the second light source 44B illuminates the original 40 to obtain a second color image of the original 40 that is then captured by the imaging member 32. In FIG. 7C and at step 104 in FIG. 11, the third light source 44C illuminates the original 40 to obtain a third color image of the original 40 that is then captured by the imaging member 32. The first light source, second light source, and third light source 44a, 44b, and 44C may comprise a red, a green, and a blue LED, respectively.

At step 106, color processing is implemented to obtain a composite color image of the original 40 by combining each of the first, second, and third color images. The first, second, and third color images are used as an input value into a color table that includes corresponding color information needed to obtain a standard red, standard green, and a standard blue value of the composite color image of the original 40.

FIG. 7D and step 108 of FIG. 11 illustrates, the fourth light source 44D illuminates the original 40 to obtain a fourth color image of the original 40 that is then captured by the imaging member 32. In one embodiment the additional color is ultraviolet or Infra-Red (IR).

At step 110, color processing of the fourth image is performed to obtain information related to the original 40. In case the additional color is UV the information relating to the original 40 include an edge location of the original 40, a media type of the original 40, and a gamut of the original 40. In case the additional color is IR the information relating to original 40 includes information about dirt or dust on the original 40.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An imaging device for illuminating and imaging an original, the imaging device comprising:
a base; and
an enclosed chamber, the enclosed chamber including:
an imaging surface for holding the original, the imaging surface inclined at a predetermined angle relative to the base;
a plurality of light sources arranged around a perimeter of the imaging surface for illuminating the imaging surface and the original;
a reflective member positioned opposite to the imaging surface for receiving and reflecting light from the plurality of light sources and reflected from the original on the imaging surface; and
an imaging member disposed adjacent to an edge of the imaging surface and oriented towards the reflective member, to receive the reflected light from the reflective member.

2. The imaging device according to claim 1, wherein the plurality of light sources include at least one red color LED, at least one blue color LED, and at least one green color LED.

3. The imaging device according to claim 2, wherein the plurality of light sources include at least one LED having a color other than red, blue, and green.

4. The imaging device according to claim 1, wherein the plurality of light sources include at least one red color LED, at least one blue color LED, at least one green color LED, and at least one of an ultraviolet LED and an infrared LED.

5. The imaging device according to claim 1, the enclosed chamber further comprising a ledge disposed along at least a portion of one edge of the imaging surface to support the original placed on the imaging surface.

6. The imaging device according to claim 1, the predetermined angle being about 80 degrees.

7. The imaging device according to claim 1, wherein the imaging member is a monochromatic imaging member.

8. The imaging device according to claim 1, further comprising a plurality of light guides, each of the plurality of light guides positioned in front of a respective one of the plurality of light sources, the plurality of light guides securing the plurality of light sources to the imaging surface.

9. A method for illuminating and imaging an original in an imaging device, comprising:
placing the original on an imaging surface in the imaging device;
illuminating the original from a perimeter of the imaging surface with a first light source that includes a first color;

receiving at a reflecting member light from the first light source and reflected from the original and reflecting the received light to a camera positioned adjacent to an edge of the imaging surface;

capturing with the camera a first image of the original illuminated by the first color;

illuminating the original from the perimeter of the imaging surface with a second light source that includes a second color, the second color being different from the first color;

receiving at the reflecting member light from the second light source and reflected from the original and reflecting the received light to the camera;

capturing with the camera a second image of the original illuminated by the second color;

illuminating the original from the perimeter of the imaging surface with a third light source that includes a third color, the third color being different from the first and second colors;

receiving at the reflecting member light from the third light source and reflected from the original and reflecting the received light to the camera;

capturing with the camera a third image of the original illuminated by the third color;

illuminating the original from the perimeter of the imaging surface with at least one additional light source that includes an additional color, the additional color being different from the first, second, and third colors;

receiving at the reflecting member light from the at least one additional light source and reflected from the original and reflecting the received light to the camera;

capturing at least one additional image of the original illuminated by the additional color with the camera;

processing the first image, the second image, and the third image, to obtain a composite color image of the original; and processing the at least one additional image of the original to obtain information relating to the original.

10. The method of claim 9, wherein the first color comprises red, the second color comprises green, and the third color comprises blue.

11. The method of claim 9, wherein the additional color comprises at least one of an ultra-violet light source and an infrared light source.

12. The method of claim 11 wherein the at least one additional light source comprises an ultraviolet light source and the additional information includes at least one of an edge location of the original, a media type of the original and a gamut of the original.

13. The method of claim 11 wherein the at least one additional light source comprises an infrared light source and the additional information includes at least one of dirt locations on the original and dust locations on the original.

14. A method for illuminating and imaging an original in an imaging device, the method comprising:

placing the original on an imaging surface in the imaging device;

illuminating the original from a perimeter of the imaging surface with a first light source that includes a first color;

receiving at a reflecting member light from the first light source and reflected from the original and reflecting the received light to a camera positioned adjacent to an edge of the imaging surface;

capturing with the camera a first image of the original illuminated by the first color;

illuminating the original from the perimeter of the imaging surface with a second light source that includes a second color, the second color being different from the first color;

receiving at the reflecting member light from the second light source and reflected from the original and reflecting the received light to the camera;

capturing with the camera a second image of the original illuminated by the second color;

illuminating the original from the perimeter of the imaging surface with a third light source that includes a third color, the third color being different from the first and second colors;

receiving at the reflecting member light from the third light source and reflected from the original and reflecting the received light to the camera;

capturing with the camera a third image of the original illuminated by the third color;

illuminating the original from the perimeter of the imaging surface with at least one additional light source that includes an additional color;

receiving at a reflecting member light from the at least one additional light source and reflected from the original and reflecting the received light to the camera;

capturing with the camera at least one additional image of the original illuminated by the additional color, the additional color being different from the first, second, and third colors; and processing the first image, the second image, the third image, and the at least one additional image to obtain a composite color image of the original in which metameric mismatch is substantially eliminated.

15. The method according to claim 14, wherein the first color comprises red, the second color comprises green, and the third color comprises blue.

* * * * *